United States Patent
Berke et al.

(10) Patent No.: US 8,479,499 B2
(45) Date of Patent: Jul. 9, 2013

(54) SYSTEM AND METHOD FOR INHIBITING REGENERATION OF A DIESEL PARTICULATE FILTER

(75) Inventors: Paul L. Berke, Chicago, IL (US); Matthew Tyo, Lisle, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 282 days.

(21) Appl. No.: 12/975,958

(22) Filed: Dec. 22, 2010

(65) Prior Publication Data

US 2011/0088371 A1   Apr. 21, 2011

Related U.S. Application Data

(63) Continuation of application No. 11/711,513, filed on Feb. 26, 2007, now abandoned.

(60) Provisional application No. 60/780,535, filed on Mar. 9, 2006, provisional application No. 60/780,586, filed on Mar. 9, 2006.

(51) Int. Cl.
    *F01N 3/00*   (2006.01)

(52) U.S. Cl.
    USPC .................. 60/295; 60/274; 60/286; 60/311

(58) Field of Classification Search
    USPC .................................................. 60/274–324
    See application file for complete search history.

(56) References Cited

U.S. PATENT DOCUMENTS

| | | | | |
|---|---|---|---|---|
| 5,974,794 A | * | 11/1999 | Gotoh et al. | 60/286 |
| 7,043,903 B2 | * | 5/2006 | Onodera et al. | 60/295 |
| 7,401,462 B2 | * | 7/2008 | Naik et al. | 60/274 |
| 7,533,523 B2 | * | 5/2009 | Wang et al. | 60/295 |
| 2007/0234711 A1 | | 10/2007 | Berke | |
| 2008/0163610 A1 | * | 7/2008 | Baird et al. | 60/295 |
| 2008/0229744 A1 | | 9/2008 | Gronberg | |
| 2008/0256928 A1 | | 10/2008 | Hunter | |
| 2011/0225949 A1 | * | 9/2011 | Tewari et al. | 60/274 |

OTHER PUBLICATIONS

Report from the International Searching Agency; International Application No. PCT/US07/63199; mailed on Jul. 7, 2008.

* cited by examiner

*Primary Examiner* — Thomas Denion
*Assistant Examiner* — Jesse Bogue
(74) *Attorney, Agent, or Firm* — Mark C. Bach; Jeffrey P. Calfa

(57) ABSTRACT

A system and method for initiation and control of passive regeneration (38) of a diesel particulate filter (34), and the integration of that regeneration strategy with an active regeneration strategy (36) and a strategy (40, 40A) for inhibiting passive regeneration. Passive regeneration can be initiated by driver actuation of an instrument panel device, such as a switch, while the vehicle is parked with the engine idling provided that certain conditions confirming that the vehicle is parked and the engine is at proper temperature are satisfied. Regeneration is inhibited by driver actuation of another switch for a maximum amount of time that may be shorter, or even prevented if DPF loading is too high.

6 Claims, 11 Drawing Sheets

SYSTEM AND METHOD FOR INHIBITING REGENERATION OF A DIESEL PARTICULATE FILTER

REFERENCE TO RELATED APPLICATIONS AND PRIORITY CLAIMS

This application claims the priority of Provisional Application Nos. 60/780,535, and 60/780,586, both filed on 9 Mar. 2006, and is a continuation of application Ser. No. 11/711,513 filed on Feb. 26, 2007 now abandoned.

FIELD OF THE INVENTION

This invention relates generally to emission control systems in motor vehicles, such as trucks, that are powered by internal combustion engines, more particularly diesel engines that have certain exhaust gas treatment devices for treating exhaust gases passing through their exhaust systems. The invention especially relates to a system and method for inhibiting regeneration of a diesel particulate filter (DPF) under certain conditions.

BACKGROUND OF THE INVENTION

A known system for treating exhaust gas passing through an exhaust system of a diesel engine comprises a diesel oxidation catalyst (DOC) associated with a diesel particulate filter (DPF). The combination of these two exhaust gas treatment devices promotes chemical reactions in exhaust gas and traps diesel particulate matter (DPM) as exhaust flows through the exhaust system from the engine, thereby preventing significant amounts of pollutants such as hydrocarbons, carbon monoxide, soot, SOF, and ash, from entering the atmosphere.

A DPF requires regeneration from time to time in order maintain particulate trapping efficiency. Regeneration involves creating conditions that will burn off trapped particulates whose unchecked accumulation would otherwise impair DPF effectiveness.

The creation of conditions for initiating and continuing regeneration generally involves elevating the temperature of exhaust gas entering the DPF to a suitably high temperature. Because a diesel engine typically runs relatively cool and lean, the post-injection of diesel fuel can be used as part of the strategy to elevate exhaust gas temperatures entering the DPF while still leaving excess oxygen for burning the trapped particulate matter.

When a vehicle is being driven in a way conducive to DPF regeneration, such as at highway speed, the regeneration process may be conducted with little or no significant effect on vehicle driveability, and is typically initiated either automatically by a regeneration initiation strategy. Regeneration occurring under these circumstances may be referred to as "active" regeneration. However, elevation of exhaust gas temperature for initiating "active" DPF regeneration may not always be appropriate for the manner in which a vehicle is being operated.

A related patent filing (Ser. No. 11/711,514) is directed toward a system and method for enhanced "passive" DPF regeneration under circumstances where "active" regeneration may be considered inappropriate. "Passive" regeneration refers to regeneration that results in significantly lower temperature for exhaust gases exiting the DPF than would be the case for "active" regeneration. Consequently, that inventive system and method are considered suitable for DPF regeneration with the engine running while the vehicle is parked.

That invention involves using essentially nitrogen dioxide-based regeneration for passive DPF regeneration instead of the essentially oxygen-based regeneration that characterizes active DPF regeneration. When a vehicle is parked with the engine running, the driver can initiate passive regeneration manually, such as by operating a switch. The engine control system will begin to operate the engine in a way that will force passive regeneration.

When the passive regeneration strategy is invoked, the control system locks out the active regeneration strategy.

SUMMARY OF THE INVENTION

The present invention is disclosed here in a system and method for inhibiting the passive regeneration strategy mentioned above. Principles of the present invention can however be applied to inhibiting other DPF regeneration strategies.

The system provides an input that is available to the driver, such as one or more switches in the instrument panel, that can be operated to initiate regeneration, to prevent initiation of regeneration, and to terminate an on-going regeneration. One aspect of the invention relates to a diesel engine comprising an exhaust system through which exhaust gases created by combustion in combustion chambers pass to atmosphere and which comprises an after-treatment device that treats the gases before leaving the exhaust system but that at times requires regeneration by elevation of temperature of the gases to a regeneration temperature range.

An engine control system comprises a regeneration strategy for processing various data to control engine operation in a way that conditions the gases to cause regeneration of the after-treatment device.

One or more personnel operated devices enable a person to selectively allow and disallow the regeneration strategy to be active.

Another general aspect relates to a method for selectively allowing and disallowing a regeneration strategy that controls regeneration of an exhaust after-treatment device in an exhaust system of a diesel engine that propels a motor vehicle to be active. The method comprises manually actuating a switch in the vehicle to select one of allowing the regeneration strategy to be active and disallowing the regeneration strategy to be active.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
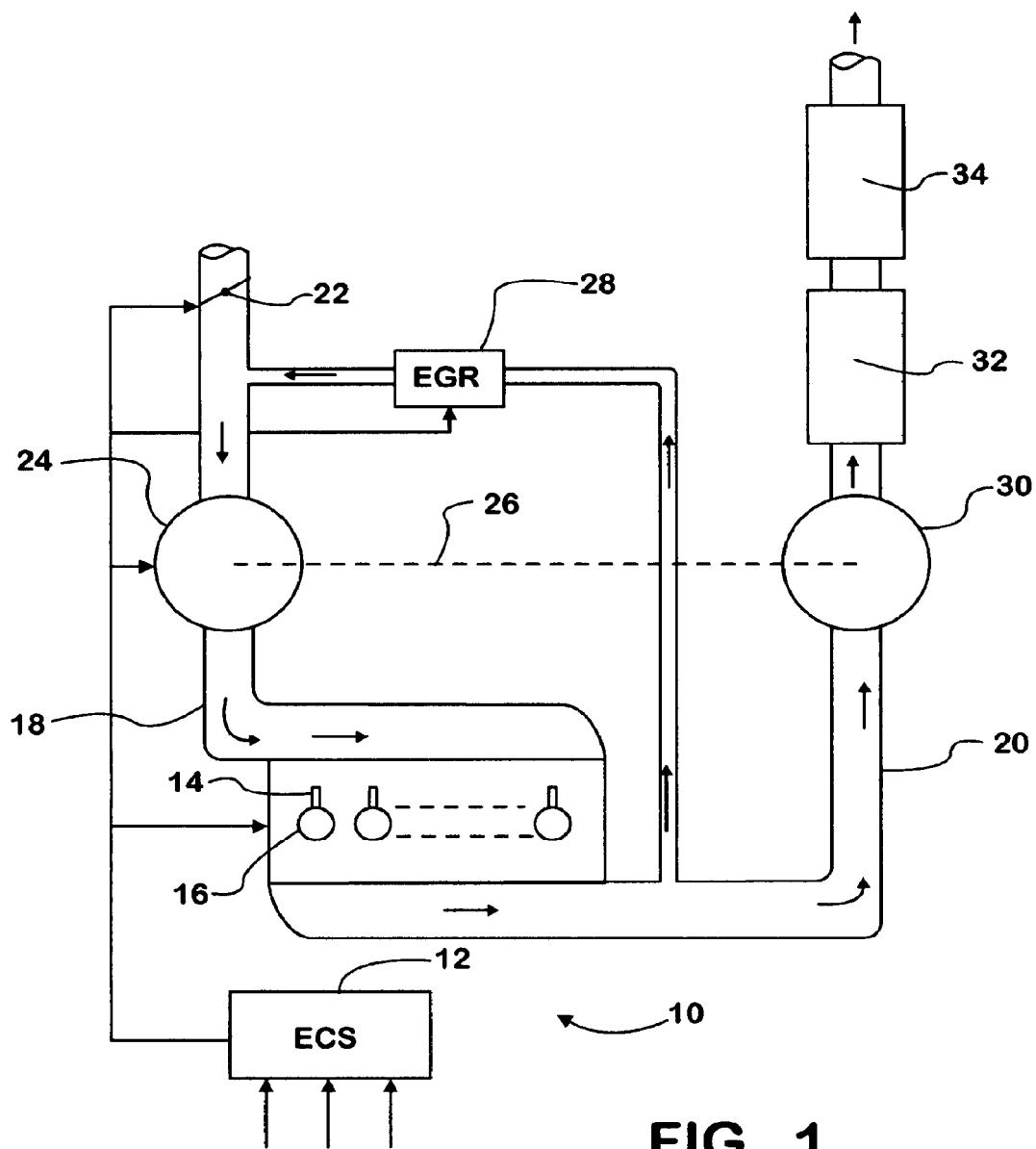
FIG. 1 is a basic schematic diagram of portions of a diesel engine relevant to the present invention.

FIG. 1 shows a schematic diagram of an exemplary diesel engine 10 for powering a motor vehicle. Engine 10 has a processor-based engine control system (ECS) 12 that processes data from various sources to develop various control data for controlling various aspects of engine operation. The data processed by control system 12 may originate at external sources, such as sensors, and/or be generated internally.

Control system 12 controls the operation of electric-actuated fuel injectors 14 that inject fuel into engine combustion chambers 16. A processor of control system 12 can process data sufficiently fast to calculate, in real time, the timing and duration of injector actuation to set both the timing and the amount of fueling for main and post-injection.

Engine 10 further comprises an intake system 18 through which charge air enters combustion chambers 16, and an exhaust system 20 through which exhaust gases resulting from combustion leave the engine. Intake system 18 comprises a throttle valve 22, the compressor portion 24 of a turbocharger 26, and an EGR valve 28. Exhaust system 20 comprises the turbine portion 30 of turbocharger 26 and after-treatment devices 32, 34, the latter being a DPF.

From time to time, DPF 34 must be regenerated in order to purge it of trapped particulate matter so that it can remain effective to trap particulate matter as the engine continues to run.

The method for control of DPF regeneration (the invention that is the subject of Ser. No. 11/711,514) is performed by suitable algorithms implemented in ECS 12 to process various data from various sources.

Figure 2:
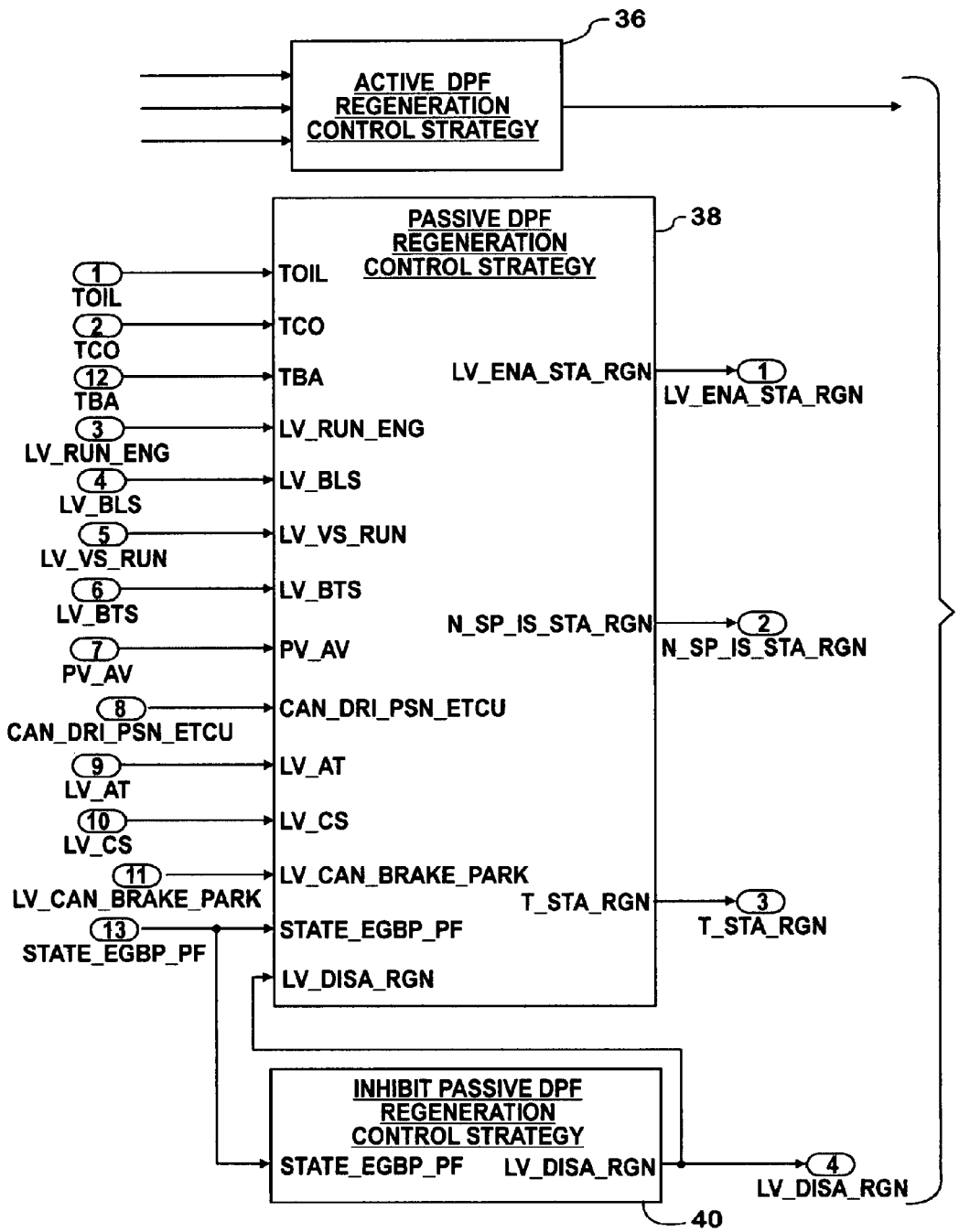
FIG. 2 is a general strategy diagram that includes the present invention.

The strategy shown in FIG. 2 comprises an Active DPF Regeneration Control Strategy 36, a Passive DPF Regeneration Control Strategy 38, and an Inhibit Strategy 40 for Inhibiting Passive DPF Regeneration Control Strategy 38. It is Inhibit Strategy 40 that embodies principles of the present invention.

Active Strategy 36 comprises a strategy for oxygen-based regeneration of DPF 34, a strategy that is typically used when a vehicle being propelled by engine 10 is being driven over the road.

Passive Strategy 38 comprises a strategy for nitrogen dioxide-based regeneration of DPF 34, a strategy that is can be used when the vehicle is parked with the engine running.

Inhibit Strategy 40 comprises a strategy for inhibiting Passive regeneration.

The detailed strategy diagrams shown in the drawings employ certain standard logic symbols including symbols for comparison and switch functions. The fact any logic symbol may by itself suggest certain relationships for certain conditions is not meant to imply that such relationships for the specific conditions involved in the strategies shown here apply. The applicable relationships are set forth in the detailed written description presented here.

Figure 3A:
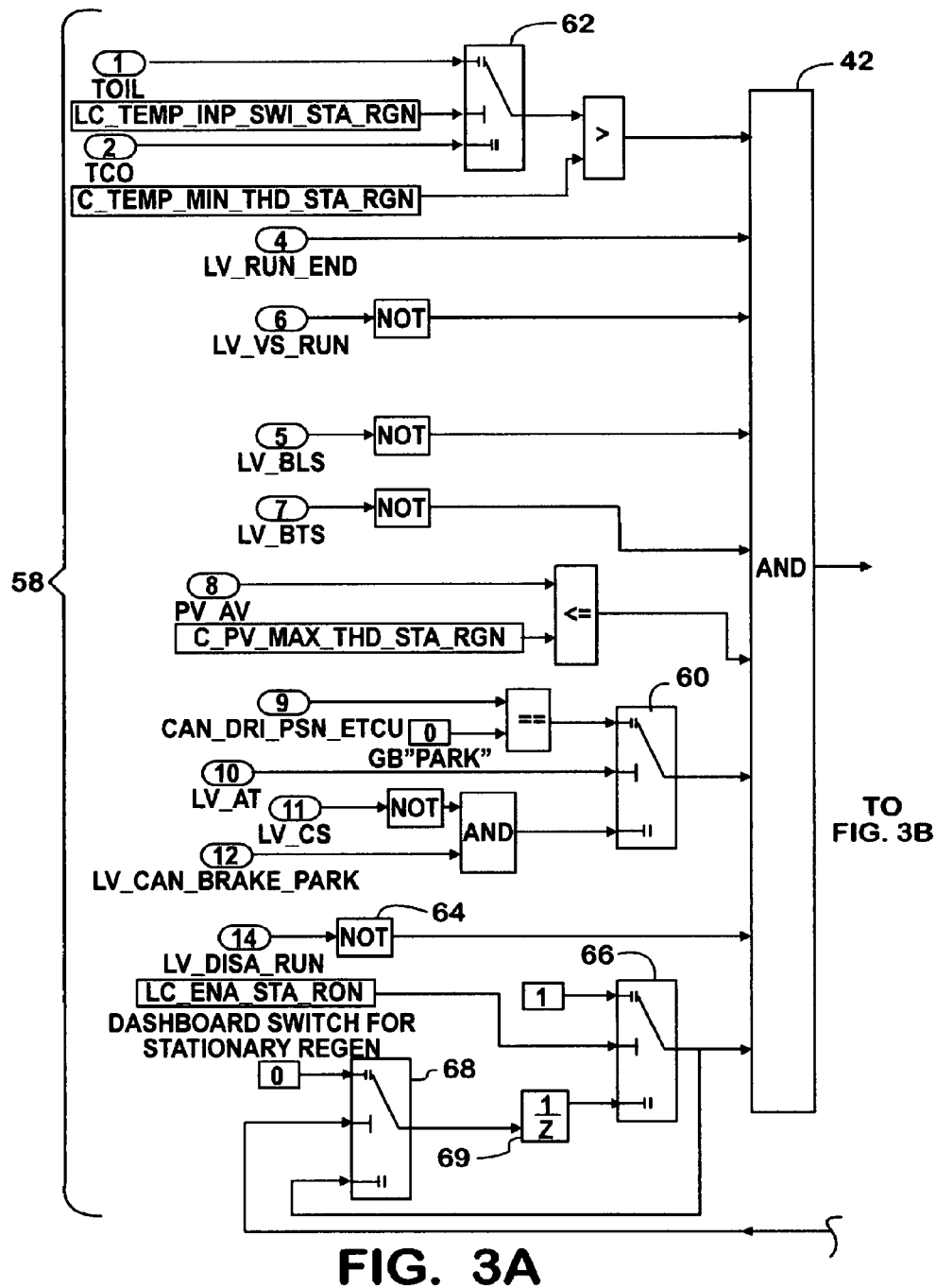
FIGS. 3A and 3B collectively show more detail of a portion of the strategy of FIG. 2.

Strategy 38 comprises an AND logic function 42 shown in FIG. 3A. All inputs to AND logic function 42 must be satisfied (logic "1's") for the function to enable passive regeneration to be performed. Such enablement is signaled by parameter LV_ENA_STA_RGN (see FIG. 3B) being a logic "1". A delay function 44 imparts a slight delay in enabling passive regeneration after AND logic function 42 has been satisfied.

When LV_ENA_STA_RGN changes from a logic "0" to a logic "1" after the delay, a timer function 46 is also started to begin timing the duration of passive regeneration enablement. Maximum and minimum times for passive regeneration enablement are set by parameters C_T_MAX_STA_RGN and C_T_MIN_STA_RGN. Respective comparison functions 48 and 50 compare the time elapsed on timer function 46 with the respective parameters C_T_MAX_STA_RGN and C_T_MIN_STA_RGN.

As long as the elapsed time is equal to or less than C_T_MAX_STA_RGN, the output of function 48 is a logic "0". Once the elapsed time becomes greater than C_T_MAX_STA_RGN, the output of function 48 becomes a logic "1".

As long as the elapsed time is less than C_T_MIN_STA_RGN, the output of function 50 is a logic "0". Once the elapsed time equals or exceeds C_T_MIN_STA_RGN, the output of function 50 becomes a logic "1".

The output of function 50 forms one input to an AND logic function 52. The other input to AND logic function 52 is the output of another comparison function 54. The outputs from AND logic function 52 and comparison function 48 are inputs to an OR logic function 56.

The two inputs to comparison function 54 are parameters STATE_EGBP_PF and C_STATE_EGBP_PF_STOP_STA_RUN. The former parameter is an indication of the extent to which DPF 34 is loaded with trapped particulates, and may be measured in any suitably appropriate way. The latter parameter represents a threshold value for DPF loading that distinguishes between the presence and absence of a need for DPF regeneration.

When STATE_EGBP_PF is less than C_STATE_EGBP_PF_STOP_STA_RUN, the output of function 54 is a logic "0". When STATE_EGBP_PF is equal to or greater than C_STATE_EGBP_PF_STOP_STA_RUN, the output of function 54 is a logic "1".

Once passive regeneration has been enabled, functions 50, 52, and 54 coact to force the output of logic function 52 to logic "0" while timing function is timing the minimum time set by C_T_MIN_STA_RGN. Once that minimum time has been equaled and exceeded, the output of logic function 52 is determined by the presence or absence of a need for continuing regeneration. A need for continued regeneration, as signaled by the result of comparing STATE_EGBP_PF and C_STATE_EGBP_PF_STOP_STA_RUN, will cause the output of logic function 52 to remain logic "0". Absence of a need for regeneration, as signaled by the result of comparing STATE_EGBP_PF and C_STATE_EGBP_PF_STOP_STA_RUN, will cause the output of logic function 52 to become a logic "1".

As long as the output of logic function 52 remains a logic "0" during regeneration enablement while the timing function times to the maximum time set by C_T_MAX_STA_RGN, the output of OR logic function 56 remains a logic "0". Should the output of logic function 52 change to a logic "1" during that time, the output of OR logic function 56 would switch from a logic "0" to a logic "1". Otherwise the output of OR logic function 56 will switch from a logic "0" to a logic "1" upon the timing function timing to the maximum time C_T_MAX_STA_RGN.

The output of OR logic function 56 therefore serves as one means to terminate an on-going passive regeneration based on length of the regeneration time and the condition of the DPF. It also assures that once passive regeneration has been enabled, it will be allowed to continue for some minimum time (set by C_T_MIN_STA_RGN), provided that the on-going regeneration is not aborted by a change in some other parameter input to AND function 42 that was satisfied in order to enable the passive regeneration to begin.

The various inputs to AND logic function 42 represented generally by the reference numeral 58 in FIG. 3A are parameters that serve to assure that the vehicle is and remains parked with the engine running at a temperature suitable for regeneration. Some degree of redundancy may be inherent in the use of numerous parameters for giving such assurance, and/or selection functions such as functions 60, 62 may be used to select one parameter to the exclusion of another. Any given input parameter may not be a direct input to AND logic function 42, but may be processed based on the specific condition that the logic value (LV) of the parameter represents. Hence it is the logic complement of some parameters that may be the direct input to AND logic function 42 by processing them with a NOT function as shown for several parameters, such as LV_VS_RUN, LV_BLS, and LV_BTS.

Two specific input parameters to AND logic function 42, LC_ENA_STA_RGN and LV_DISA_RGN, deserve detailed discussion.

Parameter LC_ENA_STA_RGN will change from a logic "0" to a logic "1" when the device (such as an instrument panel switch) that is operated by the driver to initiate passive regeneration is operated.

Parameter LV_DISA_RGN is a logic signal from the inhibit strategy 40 that will inhibit initiation of passive regeneration or terminate an on-going passive regeneration by change of state from a logic "0" to a logic "1". The strategy for determining the logic value for LV_DISA_RGN will be described in detail later with particular reference to FIG. 4.

In the logic strategy of FIG. 3A, it is the complement of LV_DISA_RGN (obtained by processing LV_DISA_RGN with a NOT logic function 64) that is the direct input to AND logic function 42 so that the condition "regeneration not inhibited (by strategy 40)" is one of the enablers of AND logic function 42 while the condition "regeneration inhibited" is a disqualifier of function 42 by itself.

Switch functions 66, 68 are associated with OR logic function 56 and LC_ENA_STA_RGN. The output of OR logic function 56 controls switch function 68 while LC_ENA_STA_RGN controls switch function 66.

Whatever the nature of the particular instrument panel device that the driver operates to cause LC_ENA_STA_RGN to request a passive regeneration via switch function 66, the effect on switch function 66 is to switch the output of the switch function to a logic "1" only long enough to assure that the data value provided by OR logic function 56 will switch to a logic "1".

When OR logic function 56 switches to a logic "0", it operates switch function 68 to cause the latter to switch the logic "1" that switch function 66 is inputting to AND logic function 42 to a store 69 that stores the logic "1" value. Consequently, when switch function 66 reverts to the state it had been in prior to the passive regeneration request from the driver, it will continue to supply a logic "1" to AND logic function 42 because of the logic "1" in store 69.

Continued enablement of AND logic function 42 however now depends on OR logic function 56. Because the latter logic function will remain a logic "0" for at least the minimum time set by C_T_MIN_STA_RGN regardless of the extent to which DPF 34 is loaded with trapped particulates, switch function 66 will continue to enable AND logic function 42 for at least that minimum time, and AND logic function 42 will continue to provide a logic "1" output provided that it is not disqualified by a change in some other input parameter.

If, after elapse of the minimum time set by C_T_MIN_STA_RGN, the loading of the DPF still exceeds the level set by C_STATE_EGPB_PF_STOP_STA_RGN, regeneration will be allowed to continue until the earlier occurrence of: DPF loading becoming less than that level and elapse of maximum time set by C_T_MAX_STA_RGN.

Unless inhibited by Inhibit Strategy 40, an on-going regeneration terminates when the output of OR logic function switches from a logic "0" to a logic "1" to cause switch function 68 to once again supply a logic "0" to store 69. With switch 66 being in the state of transmitting the contents of store 69 to AND logic function 42, the logic "0" from the store causes the output of AND logic function to switch to logic "0".

In this way, a regeneration, once initiated by a regeneration request, must be terminated before a subsequent regeneration request can be effective.

Figure 3B:
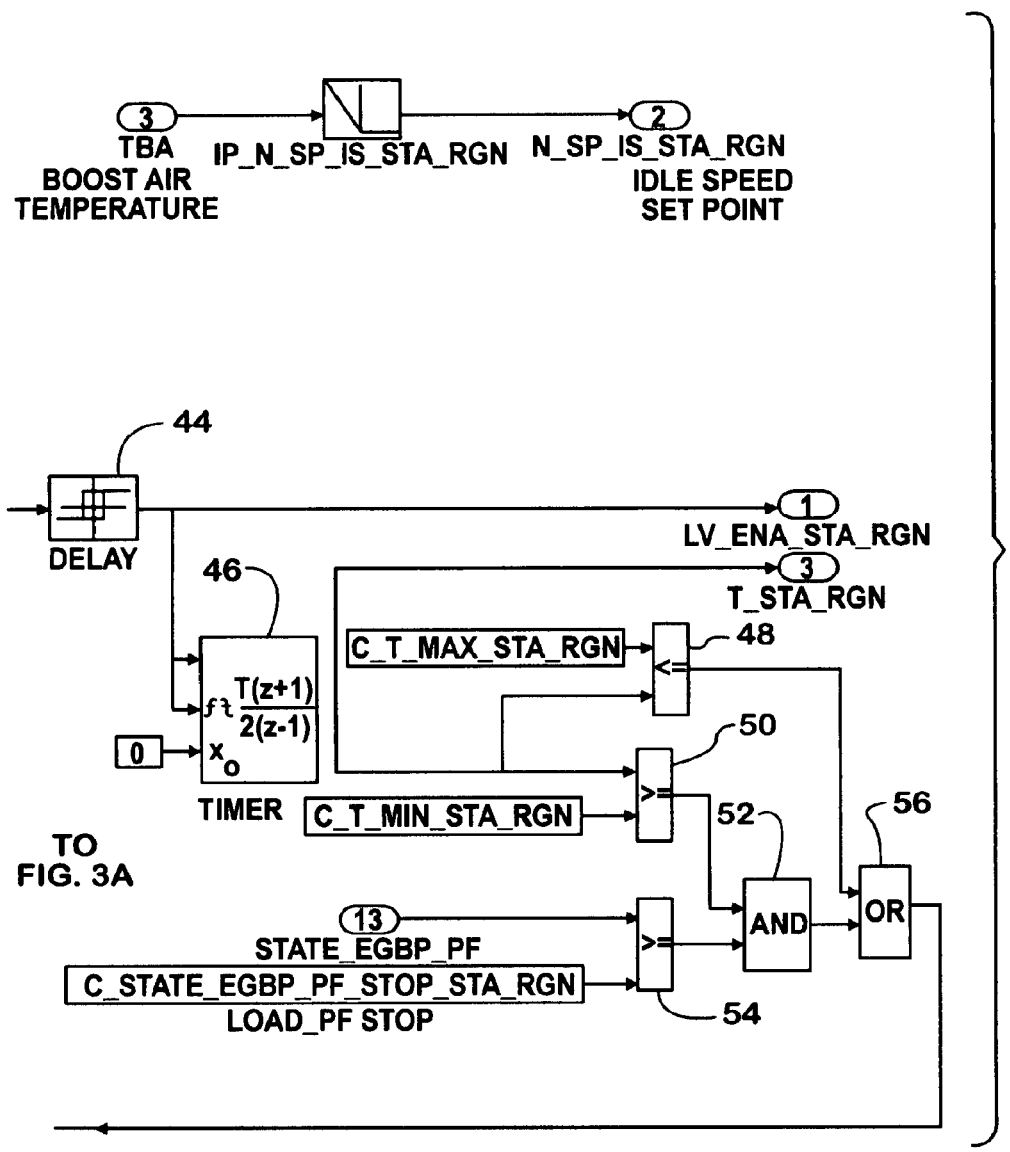

Once regeneration has been enabled by LV_ENA_STA_RGN becoming a logic "1", set points for relevant engine parameters are reset in ECS 12 to values that will initiate passive regeneration as the engine continues to run. Parameters whose set-points may be reset include: idle speed, main fuel injection timing, EGR valve position, turbocharger vane position, intake throttle position, post-injection fuel quantity, and post-injection fuel timing. FIG. 3B shows parameter TBA, representing boost air temperature, setting the set point for engine idle speed during passive regeneration N_SP_IS_STA_RGN.

Elapsed time of passive regeneration is represented by the parameter T_STA_RGN, and FIG. 3B shows that the data value for elapsed time is made available to other portions of ECS strategy as appropriate.

Figure 4:
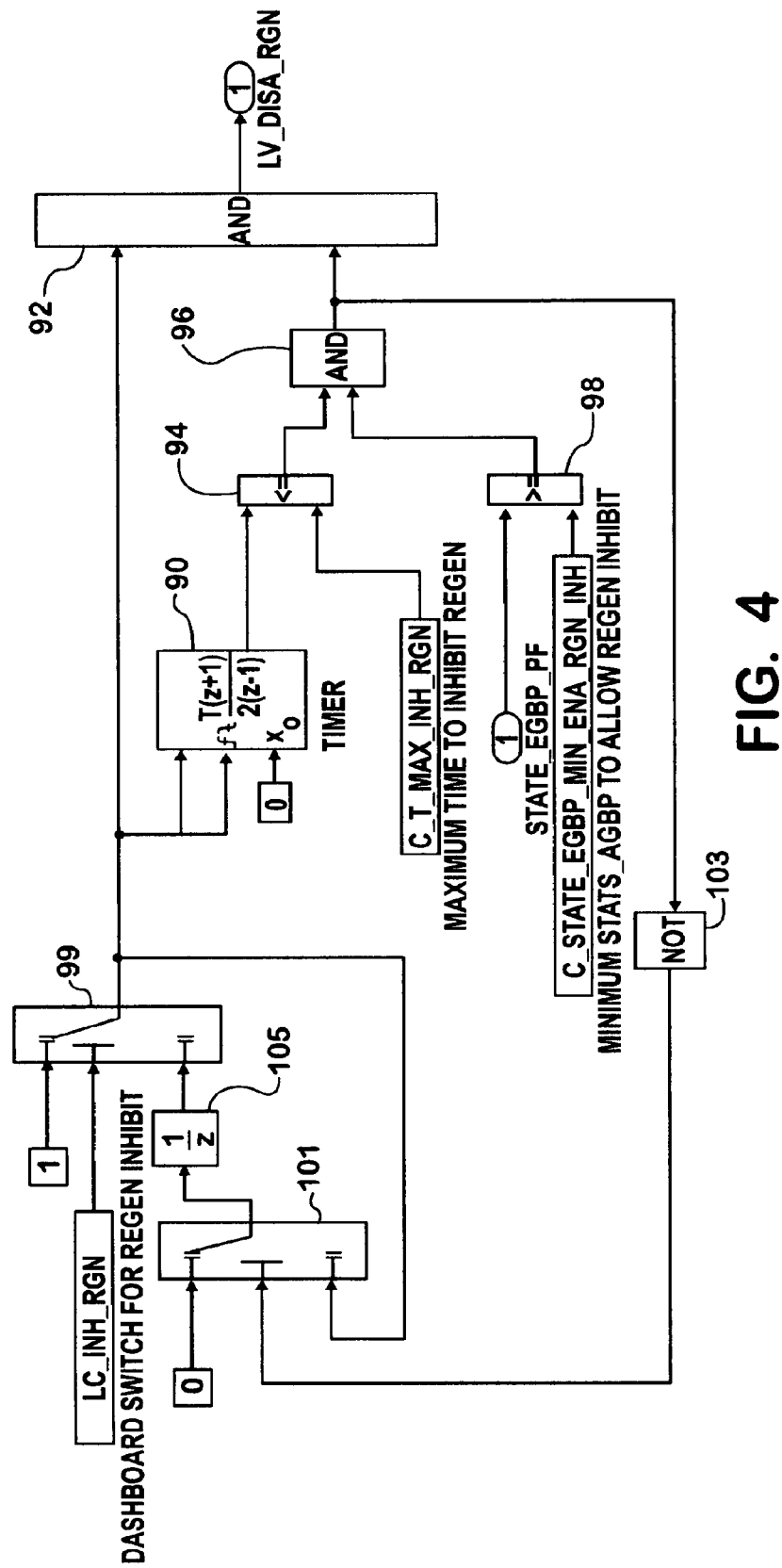
FIG. 4 shows more detail of another portion of the strategy of FIG. 2 constituting detail of the strategy of the present invention for inhibiting regeneration under certain conditions.

The present invention relating to inhibiting regeneration is next described with reference to FIG. 4 which shows detail of Inhibit Strategy 40 for inhibiting Passive regeneration.

Strategy 40 provides the parameter LV_DISA_RGN as a logic signal that will inhibit initiation of passive regeneration or terminate an on-going passive regeneration by change of state from a logic "0" to a logic "1". Exactly how the logic value for LV_DISA_RGN is determined will be explained with reference to FIG. 4. In the logic strategy of FIG. 3A, it is the complement of LV_DISA_RGN that is the direct input to AND logic function 42 so that the condition "regeneration not inhibited (by strategy 40)" is one of the enablers of AND logic function 42 while the condition "regeneration inhibited" is a disqualifier by itself. In other words whenever LV_DISA_RGN is a logic "1", on-going regeneration will be stopped and regeneration cannot commence.

When LC_INH_RGN, representing the state of a device, such as an instrument panel switch, available to the driver to inhibit regeneration, changes from a logic "0" to a logic "1" to signal operation of the device to a state requesting that regeneration be inhibited or that an on-going regeneration be stopped, a timer function 90 is started and an AND logic function 92 is enabled. A maximum time for inhibiting regeneration is set by a parameter C_T_MAX_INH_RGN. A comparison function 94 compares the time elapsed on timer function 90 with the parameter C_T_MAX_INH_RGN.

As long as the elapsed time is equal to or less than C_T_MAX_INH_RGN, the output of function 94 is a logic "1". Once the elapsed time becomes greater than C_T_MAX_INH_RGN, the output of function 94 becomes a logic "0".

The output of function 94 forms one input to an AND logic function 96. The other input to AND logic function 96 is the output of another comparison function 98. The output from AND logic function 96 is the second input to AND logic function 92.

The two inputs to comparison function 98 are parameters STATE_EGBP_PF and C_STATE_EGBP_MIN_ENA_RGN_INH. The former parameter is an indication of the extent to which DPF 34 is loaded with trapped particulates, and may be measured in any suitably appropriate way. The latter parameter represents a value for DPF loading that distinguishes between enabling and unenabling the inhibiting of regeneration.

If STATE_EGBP_PF is less than C_STATE_EGBP_MIN_ENA_RGN_INH, the output of function 98 is a logic "0". If STATE_EGBP_PF becomes equal to or greater than C_STATE_EGBP_MIN_ENA_RGN_INH, the output of function 98 becomes a logic "1".

Once inhibiting regeneration has been requested by LC_INH_RGN becoming a logic "1", functions 94, 96, and 98 coact to force the output of logic function 96 to logic "1" while timing function 90 is timing toward the maximum time set by C_T_MAX_INH_RGN, provided that the DPF is not loaded beyond the level set by C_STATE_EGBP_MIN_ENA_RGN_INH. The coaction enables function 96 to cause LV_DISA_RGN to be set to logic "1", provided that the DPF is not loaded beyond the level set by C_STATE_EGBP_MIN_ENA_RGN_INH. In other words, regeneration will be inhibited.

Regeneration would not be inhibited if the DPF were loaded to the extent that inhibiting regeneration could potentially damage the DPF.

In any event, regeneration will be inhibited at most for the time allowed by C_T_MAX_INH_RGN.

Whatever the nature of the particular instrument panel device that the driver operates to cause LC_INH_RGN to request a regeneration inhibit, such a request, unless prohibited by the level of particulates in the DPF, switches LV_DISA_RGN to a logic "1" that consequently acts via NOT logic function in FIG. 3A to disqualify AND logic function 42. The logic value "1" that is provided by LC_INH_RGN lasts only momentarily, just long enough to assure the inhibit.

LC_INH_RGN momentarily sets the state of a switch function 99 to a logic "1", applied to AND logic function 92 as mentioned above. The logic "1" is also returned to a second switch function 101 whose state is controlled by the complement of the output of AND logic function 96, the complement being provided by a NOT logic function 103.

Assuming that AND logic function 96 has been set to logic "1" under appropriate conditions specified above, the logic "0" to switch function 101 via NOT logic function 103 causes that switch function to switch the logic "1" that is being returned from switch function 99 to a store 105. In this way, switch function 99 is latched to continue the logic "1" output even after LC_IHN_RGN ceases to continue a logic "1" input to switch function 99, provided that the conditions that are causing AND logic function 96 to output a logic "1" continue to exist.

Because the function of logic function 98 is essentially to set an initial condition for allowing regeneration to be inhibited, it could cause discontinuance of an on-going inhibit before timing function does, but it would not necessarily initiate a regeneration upon causing discontinuance of an on-going inhibit.

Figure 5:
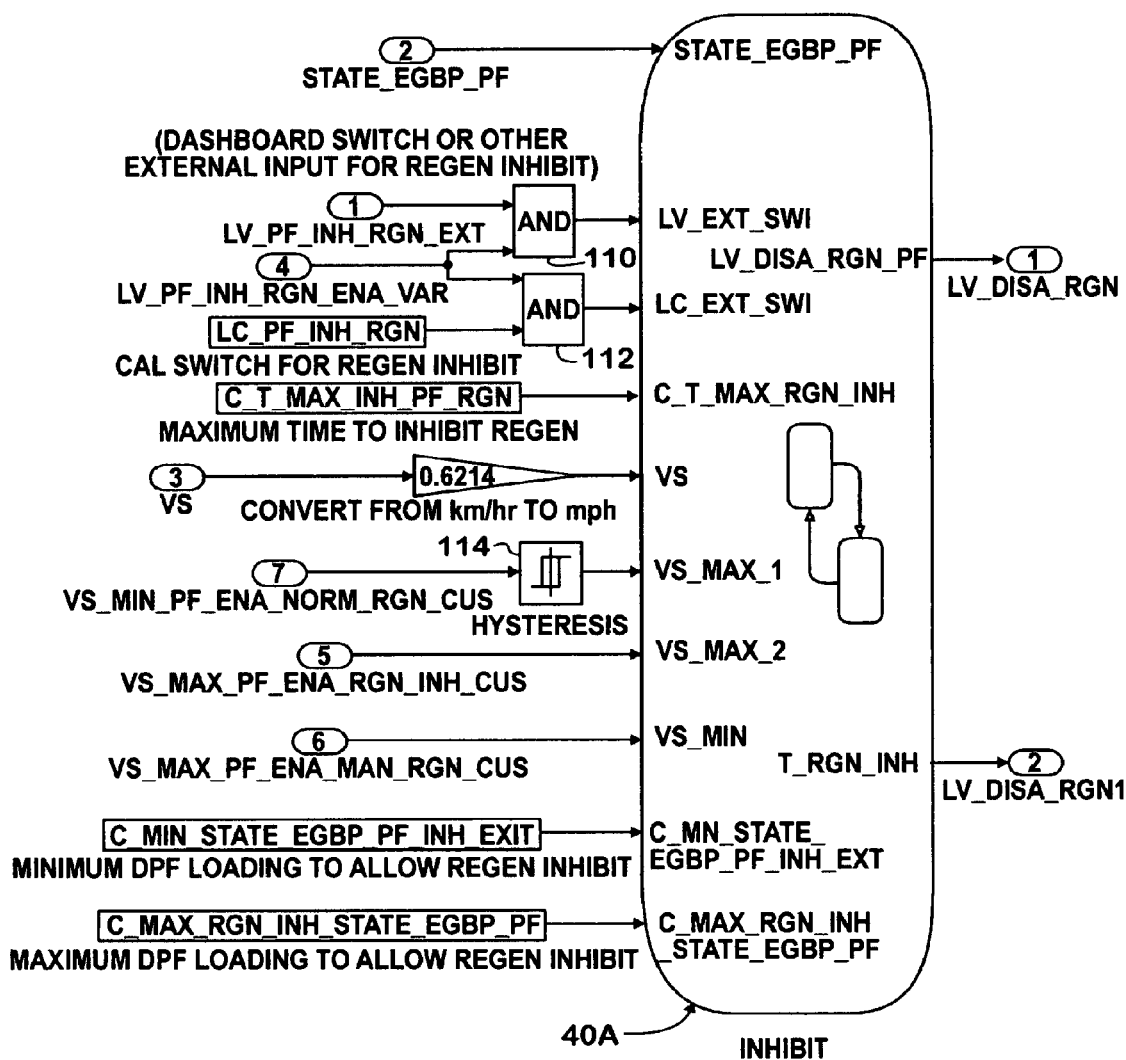
FIG. 5 is a general diagram showing another embodiment of strategy for inhibiting regeneration under certain conditions.
Figures 6, 7:
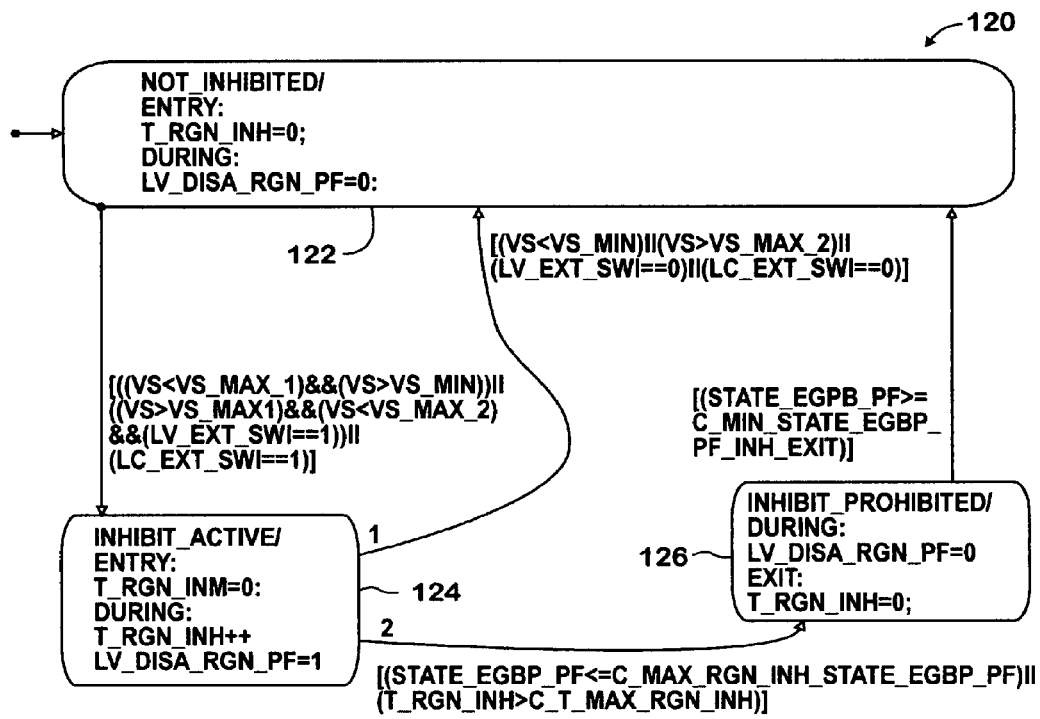
FIG. 6 is a diagram useful in explaining certain principles relating to the strategy shown in FIG. 5.
FIG. 7 is a state diagram showing possible operational states corresponding to zones of the diagram of FIG. 6.

FIGS. 5, 6, and 7 show a modified inhibit strategy 40A. While inhibit strategy 40A is capable of being activated by a discretionary inhibit request from a device such as the instrument panel switch used by a person to inhibit passive regeneration while the vehicle is stationary, strategy 40A utilizes vehicle speed as a factor for determining if regeneration will be inhibited. Therefore strategy 40A should be understood to be capable of inhibiting regeneration while a vehicle is moving, provided certain conditions are satisfied, and not only to inhibit an on-going passive regeneration while the vehicle is stationary.

The parameter STATE_EGBP_PF is a measurement or estimate of the soot load contained in DPF 34.

A parameter LV_PF_INH_RGN_EXT is an input obtained from a vehicle body controller for enabling the inhibit function.

A parameter LV_PF_INH_RGN_ENA_VAR is a programmable parameter for enabling the inhibit function.

A parameter LC_PF_INH_RGN represents the state of a manual calibration switch that enables personnel who are calibrating the system (commonly called calibrators) to calibrate certain portions of the system and associated logic.

Parameters LV_PF_INH_RGN_EXT, LV_PF_INH_RGN_ENA_VAR, and LC_PF_INH_RGN are inputs to AND logic functions 110, 112 as shown in FIG. 5.

A parameter C_T_MAX_INH_PF_RGN represents a maximum time limit for which the inhibit function, when allowed to be active, may be inhibited.

A parameter VS represents vehicle speed obtained from a vehicle speed sensor. Conversion to proper units, such as shown in FIG. 5, may be performed if necessary.

A parameter VS_MAX_PF_ENA_RGN_INH_CUS represents a vehicle speed that defines a boundary between a first speed range within which inhibit strategy 40A is not allowed to be active and a second speed range of higher speeds within which inhibit strategy is automatically allowed to be active.

A parameter VS_MIN_PF_ENA_NORM_RGN_CUS represents a vehicle speed that defines a boundary between the second speed range and a third speed range of still higher speeds within which an intentional inhibit request by the driver of the vehicle will cause inhibit strategy 40A to be active.

A parameter VS_MAX_PF_ENA_MAN_RGN_CUS represents a vehicle speed that defines a boundary between the third speed range and a fourth speed range of still higher speeds within which inhibit strategy 40A is not allowed to be active.

A range of DPF soot loads is relevant to inhibit strategy 40A. A parameter C_MIN_STATE_EGBP_PF_INH_EXIT represents the lower limit of the range and a parameter C_MAX_RGN_INH_STATE_EGBP_PF represents the upper limit of the range.

Parameters C_VS_PF_NORM_RGN_HYS_ON and C_VS_PF_NORM_RGN_HYS_OFF impart a hysteresis band to parameter VS_MAX_PF_ENA_RGN_INH_CUS for enlarging one of the second and third speed ranges at the expense of the other depending on the direction of vehicle speed changes in a speed range spanning the speed represented by parameter VS_MAX_PF_ENA_RGN_INH_CUS. This hysteresis is depicted in FIG. 5 by the reference numeral 114.

FIG. 5 shows the parameters LV_DISA_RGN and LV_DISA_RGN1 as outputs.

FIG. 6 pictorially portrays the four speed ranges as a Vehicle Speed Index where VS Index 1 equates to VS_MAX_PF_ENA_RGN_INH_CUS, VS Index 2 equates to VS_MIN_PF_ENA_NORM_RGN_CUS, and VS Index 3 equates to VS_MAX_PF_ENA_MAN_RGN_CUS. The hysteresis band represented by numeral 114 is shown bounding VS Index 2.

The control system allows the parameters shown in FIG. 6 to be set. VS Index 1 is a speed threshold below which inhibit strategy 40A is not allowed to be active, for example a speed around one mile per hour. For speeds between VS Index 1 and VS Index 2, for example a speed around fifteen miles per hour, the inhibit strategy is automatically allowed to be active. For speeds between VS Index 2 and VS Index 3, for example a speed around twenty-five miles per hour, the inhibit strategy is allowed to be active when requested by the driver of the vehicle. For speeds greater than VS Index 3, the inhibit strategy is not allowed to be active.

FIG. 7 shows a state diagram 120 comprising a NOT INHIBITED state 122, an INHIBIT ACTIVE state 124, and an INHIBIT PROHIBITED state 126.

If the vehicle speed is less than VS Index 1 or greater than VS Index 3, strategy 40A is not allowed to be active, meaning that it cannot inhibit regeneration (state 122).

VS Index 1 has a non-zero value so that activation of the passive stationary regeneration strategy continues to be allowed when the vehicle is parked.

If vehicle speed is within the range between VS Index 1 and VS Index 2, strategy 40A automatically becomes active, meaning that regeneration will be automatically inhibited provided that certain conditions are satisfied (state 124). If vehicle speed is within the range between VS Index 2 and VS Index 3, strategy 40A will not become active unless the driver is intentionally requesting that regeneration be inhibited, meaning that regeneration will be inhibited as requested, provided that certain conditions are satisfied (state 126).

Figure 8:
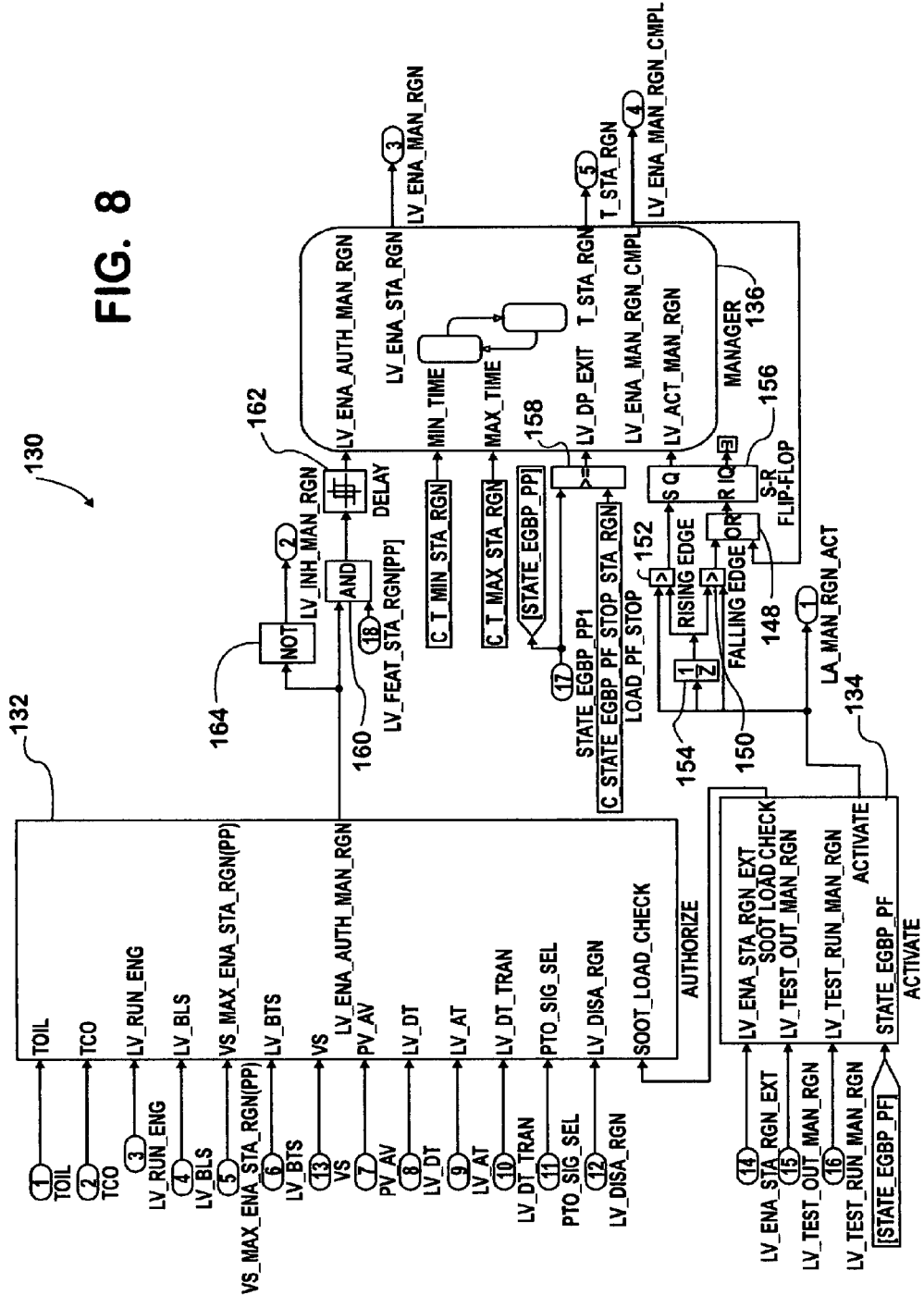
FIG. 8 is another general regeneration strategy diagram embodying principles of the present invention.

FIG. 8 shows a passive regeneration strategy 130 that utilizes many of the same parameters as the passive regeneration strategy of FIG. 2 as inputs to an Authorize strategy 132. Those parameters include: Engine Oil Temperature TOIL; Engine Coolant Temperature TCO, Engine Running LV_RUN_ENG, Brake Light Switch LV_BLS, Brake Test Switch LV_BTS, Accelerator Position PV_AV, Automatic Transmission LV_AT, and Disallow Regeneration LV_DIS-A_RGN. Other parameters used by strategy 130, but not by the strategy of FIG. 2, are: VS Index 1 VS_MAX_ENA_STA_RGN[PP] (same as VS_MAX_PF_ENA_RGN_INH_CUS); Vehicle Speed VS; Drivetrain Disengaged LV_DT; Drivetrain Disengaged Transition LV_DT_TRAN; and Power Takeoff Active PTO_SIG_SEL. (Note: the [PP] suffix denotes a programmable parameter.)

Figure 10:
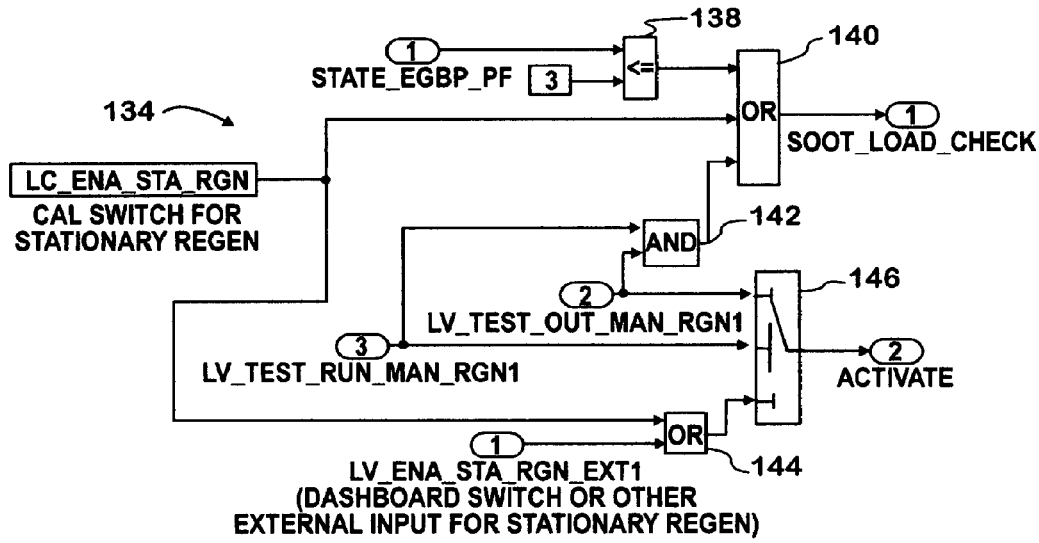
FIG. 10 shows more detail of another portion of the strategy of FIG. 8.

Another parameter used by strategy 130, but not by the strategy of FIG. 2, is SOOT_LOAD_CHECK, a parameter provided at a soot load check output of an Activate strategy 134 shown in detail in FIG. 10. Other portions of strategy 130 interface Authorize strategy 132 with a Manager strategy 136.

One output parameter of Manager strategy 136 is T_STA_RGN representing elapsed time of regeneration. Two other output parameters are LV_ENA_MAN_RGN and LV_ENA_MAN_RGN_CMPL.

Figure 9:
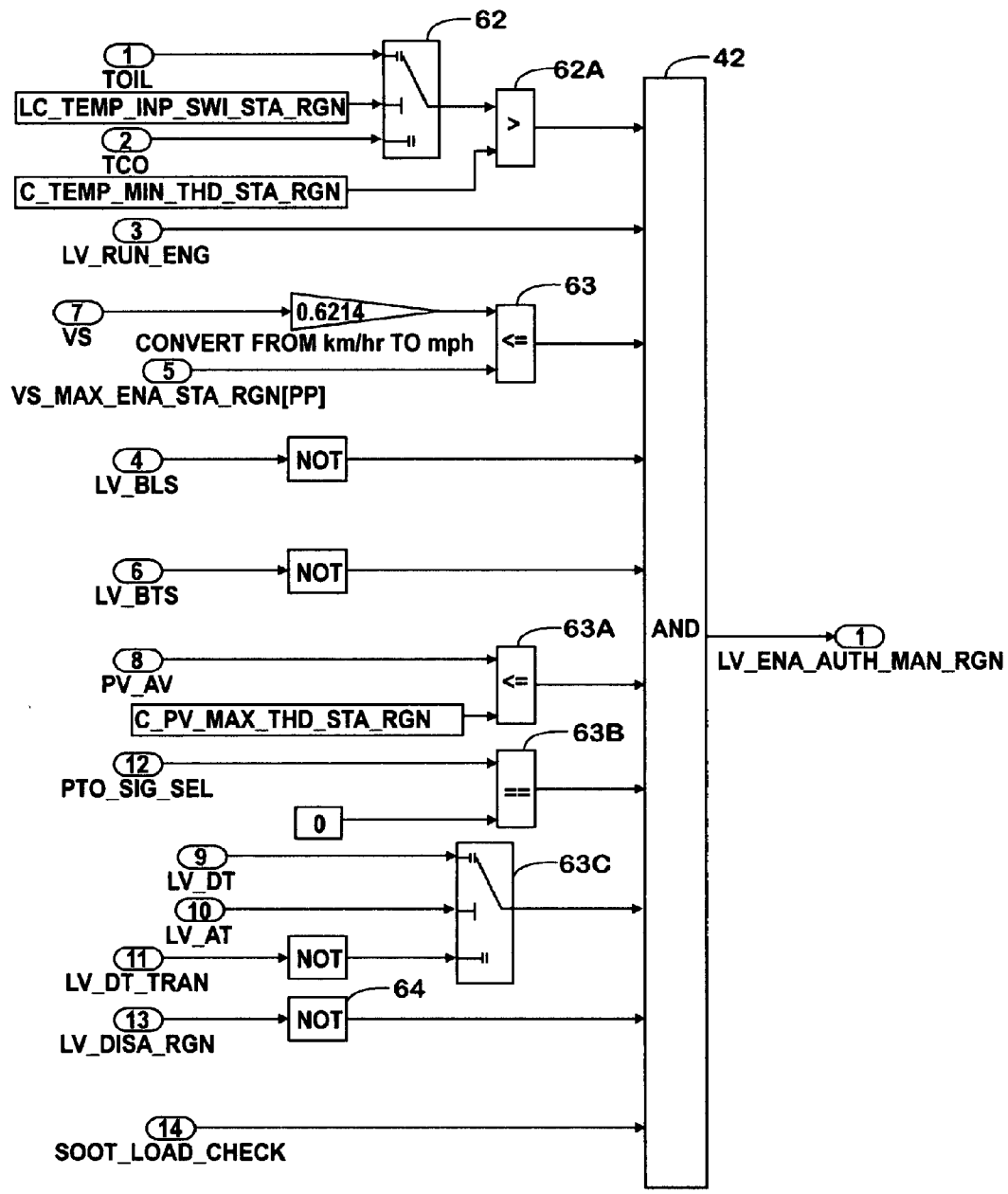
FIG. 9 shows more detail of a portion of the strategy of FIG. 8.

FIG. 9 shows more detail of Authorize strategy 132 in the same way as FIG. 3A shows more detail of strategy 38.

TOIL and TCO are selectable by a switch function 62 based on a parameter LC_TEMP_INP_SWI_STA_RGN. This allows a calibrator to select one of the two parameters as best representative of engine temperature. A comparison function 62A compares the selected parameter with a reference temperature C_TEMP_MIN_THD_STA_RGN. When the temperature represented by the selected parameter exceeds the reference temperature, the input to AND logic function 42 is a logic "1" to indicate that sufficiently high engine temperature exists to support regeneration, otherwise a logic "0".

A comparison function 63 compares Vehicle Speed VS with a parameter VS_MAX_ENA_STA_RGN[PP] representing the reference speed VS Index 1. When the vehicle speed is less than or equal to the reference speed VS Index 1, function 63 provides a logic "1" to AND logic function 42, otherwise a logic "0".

A comparison function 63A compares Accelerator Position PV_AV with a parameter C_PV_MAX_THD_STA_RGN, the latter representing a maximum allowable accelerator input relative to low idle position. When the accelerator position is at, or within a defined range of, low idle position, function 63A provides a logic "1" to AND logic function 42, otherwise a logic "0". This is to assure that the driver is not overriding low idle speed control by depressing the accelerator pedal.

A comparison function 63B compares Power Takeoff Active PTO_SIG_SEL with a logic "0". When the power takeoff (if present) is not active, or if no power takeoff is present, function 63B provides a logic "1" to AND logic function 42, otherwise a logic "0".

In the case of a vehicle having a manual transmission, no automatic transmission is present, and therefore a switch function 63C makes the logic complement of LV_DT_TRAN to the exclusion of the LV_DT effective as an input to AND logic function 42. In the case of a vehicle having an automatic transmission, switch function 63C makes LV_DT to the exclusion of the logic complement of LV_DT_TRAN effective as an input to AND logic function 42. In either of these two cases, the input to AND logic function 42 from switch function 63C is a logic "1" only when the drivetrain is disengaged from the engine, otherwise a logic "0".

Only when all inputs to AND logic function 42 are logic "1's" is the output LV_ENA_AUTH_MAN_RGN a logic "1", otherwise a logic "0". LV_ENA_AUTH_MAN_RGN may therefore be considered as authorizing, or allowing, passive regeneration. Regeneration will commence however only when activated by Activate strategy 134, detail of which is described with reference to FIG. 10.

Activate strategy 134 comprises a comparison function 138, an OR logic function 140, an AND logic function 142, a second OR logic function 144, and a switch function 146. LC_ENA_STA_RGN is an input from a switch that allows calibrators to activate stationary regeneration during engine/vehicle development.

Both the parameter SOOT LOAD CHECK and the parameter LV_MAN_RGN_ACT at an activate output of Activate strategy 134 must be set to logic "1's" in order to activate the regeneration strategy. When parameter LC_ENA_STA_RGN is set to a logic "1" by a calibrator, OR logic function 140 causes SOOT LOAD CHECK to also be a logic "1" input to AND logic function 42. OR logic function 144, acting via switch function 146 also causes LV_MAN_RGN_ACT to be a logic "1". LV_TEST_RUN_MAN_RGN1 and LV_TEST OUT_MAN_RGN1 are used by a service tool for diagnostic purposes by service personnel.

LV_ENA_STA_RGN_EXT1 is the input, such as an instrument panel switch, or other external input, that is actuated by any personnel, such as calibrators, service personnel, or the driver of the vehicle, to request stationary passive regeneration.

Comparison function 138 compares STATE_EGBP_PF with a reference parameter identified simply by the numeral "3" The reference parameter defines some threshold level of particulates that must be present in the after-treatment device in order for SOOT_LOAD_CHECK to become a logic "1". This avoids unnecessary regenerations that might otherwise be requested by personnel via parameter LV_ENA_STA_RGN_EXT1.

The parameter Activate (same as LV_MAN_RGN_ACT) is one input to the logic arrangement that interfaces Activate strategy 134 with Manager strategy 136. The logic arrangement comprises an OR logic function 148, two comparison functions 150, 152, a store 154, and a flip-flop 156. The set output of flip-flop 156 is the parameter LV_ACT_MAN_RGN that forms one input to Manager strategy 136.

There are four additional inputs to Manager strategy 136: a parameter C_T_MAX_STA_RGN representing a maximum allowed duration for a stationary regeneration (Max_time); a parameter C_T_MIN_STA_RGN representing a minimum mandatory duration for a stationary regeneration (Min_time); an output from a comparison function 158 (lv_dP_exit); and an output from a delay function 162 (LV_ENA_AUTH_MAN_RGN).

A comparison function 158 compares a parameter C_STATE_EGBP_PF_STOP_STA_RGN and STATE_EGBP_PF and provides the result as the input lv_dP_exit to Manager strategy 136.

The output parameter LV_ENA_AUTH_MAN_RGN of Authorize strategy 132 is one input to an AND logic function 160 having a parameter LV_FEAT_STA_RGN[PP] as its other input. The latter parameter is programmed into the control system of any engine that is equipped with the stationary passive regeneration strategy. The inverse of parameter LV_ENA_AUTH_MAN_RGN is provided by a NOT logic function 164 as a parameter LV_INH_MAN_RGN.

Manager function 136 operates in a similar manner to the strategy embodied in FIG. 3B described earlier.

When Authorize strategy 132 is not authorizing regeneration and an engine has the capability for passive stationary regeneration, parameter LV_ENA_AUTH_MAN_RGN is a logic "0", preventing Manager strategy 136 from becoming operational so that no regeneration occurs.

When Authorize strategy 132 authorizes regeneration and an engine has the capability for passive stationary regeneration, parameter LV_ENA_AUTH_MAN_RGN becomes a logic "1", satisfying one condition for allowing Manager strategy 136 to become operational so that passive stationary regeneration can occur. Before that operational capability can be achieved, a second condition must be satisfied. That condition is that flip-flop 156 be switched from reset to set so as to also provide a logic "1" input to Manager strategy 136. The switching of flip-flop 156 from logic "0" to logic "1" is controlled by Activate strategy 132 and some of the interface functions between the Activate and Manager strategies.

Provided that the after-treatment device has a sufficient amount of trapped soot that makes regeneration appropriate as determined by function 138, strategy 134 sets SOOT LOAD CHECK to logic "1". When LV_ENA_STA_RGN_EXT is set to logic "1" by the input device associated with it, strategy 134 sets LV_MAN_RGN_ACT to a logic "1". With store 154 storing the prior logic "0" value, the change in LV_MAN_RGN_ACT detected by function 152 functioning as a rising edge detector to apply a logic "1" to the set input of flip-flop 156 causes the flip-flop to be switched from reset condition to set condition. The content of store 154 also changes to a logic "1" so that with LV_MAN_RG-N_ACT remaining a logic "1", the output of function 152 switches back to logic "0" after it has set flip-flop 156.

Unless the regeneration strategy ceases being activated by either Authorize strategy 132 or Activate strategy 134 terminating activation, regeneration will occur for at least the minimum time set by parameter C_T_MIN_STA_RGN. If the soot level in the after-treatment device has not been reduced to a level below that set by parameter C_STATE_EGBP_PF_STOP_STA_RGN after the minimum time, regeneration will continue until the earlier of: a) soot level in the after-treatment device being reduced to a level below that set by parameter C_STATE_EGBP_PF_STOP_STA_RGN, and b) elapse of maximum time allowed for regeneration C_T_MAX_STA_RGN, unless the regeneration strategy ceases being activated by either Authorize strategy 132 or Activate strategy 134.

Should Activate strategy 134 de-activate the regeneration strategy, function 150 will function as a falling edge detector to cause flip-flop 156 to be reset and as a result cause Manager strategy 136 to end the regeneration. When Manager strategy 136 ends a regeneration by causing parameter LV_ENA_MAN_RGN_CMPL to change from logic "0" to logic "1", the change acts via OR function 148 to reset flip-flop 156. Even with Authorize strategy 132 continuing to authorize activation of the regeneration strategy, activation cannot reoccur unless LV_ENA_STA_RGN_EXT is again set to a logic "1" after having first been reset to logic "0".

Figure 11:
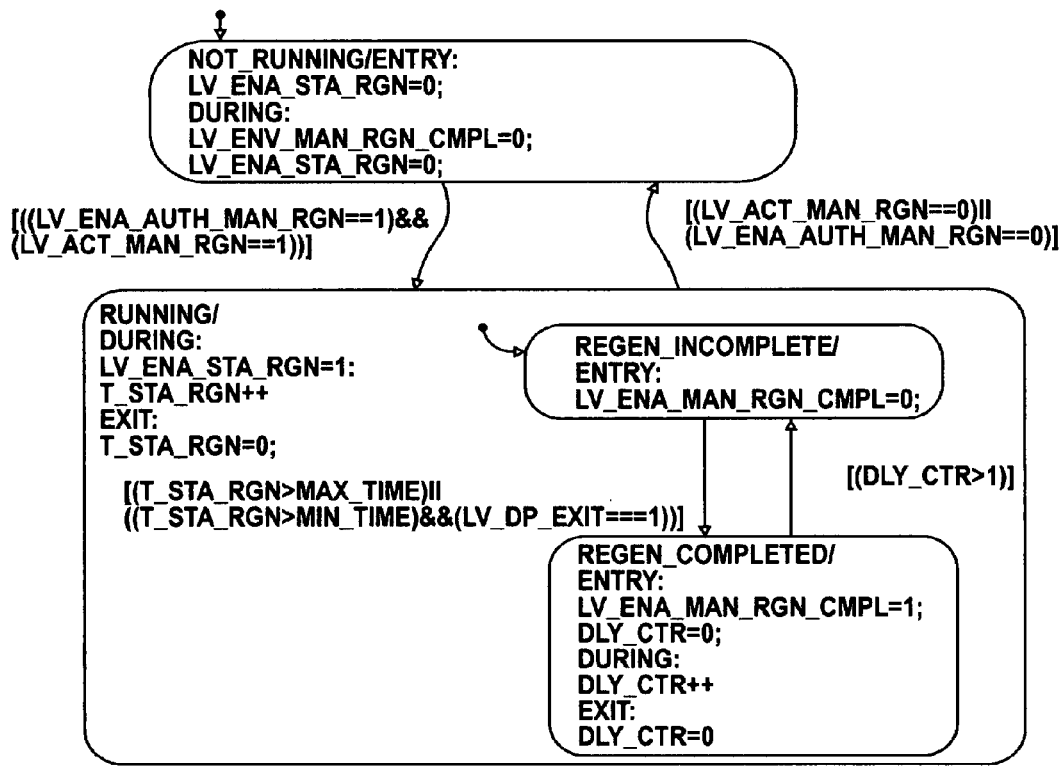
FIG. 11 is a state diagram showing possible operational states for the strategy of FIG. 8.

FIG. 11 shows the operational states that have just been described for the strategy of FIG. 8. The state bearing the heading NOT RUNNING is the state that exists when the regeneration strategy is not active. The state bearing the heading RUNNING is the state that exists when the regeneration strategy is active. At entry into the RUNNING state, a sub-state "Regen incomplete" is entered. When regeneration has become completed for any one of the reasons explained above, a sub-state "Regen completed" is entered. A slight delay is present in the execution of the strategy before the state reverts to the NOT RUNNING state so as to allow time for parameter inputs to the manager strategy to assume appropriate values consistent with de-activating the strategy as a condition precedent to a subsequent activation.

When parameter LV_ENA_MAN_RGN is set to a logic "1", it causes the engine to operate in a way that conditions exhaust gases for causing nitrogen dioxide-based regeneration of the after-treatment device. It does so via certain actuators. Various actuators can be ramped-in at various times and rates while the stationary regeneration strategy is active.

Figure 12:
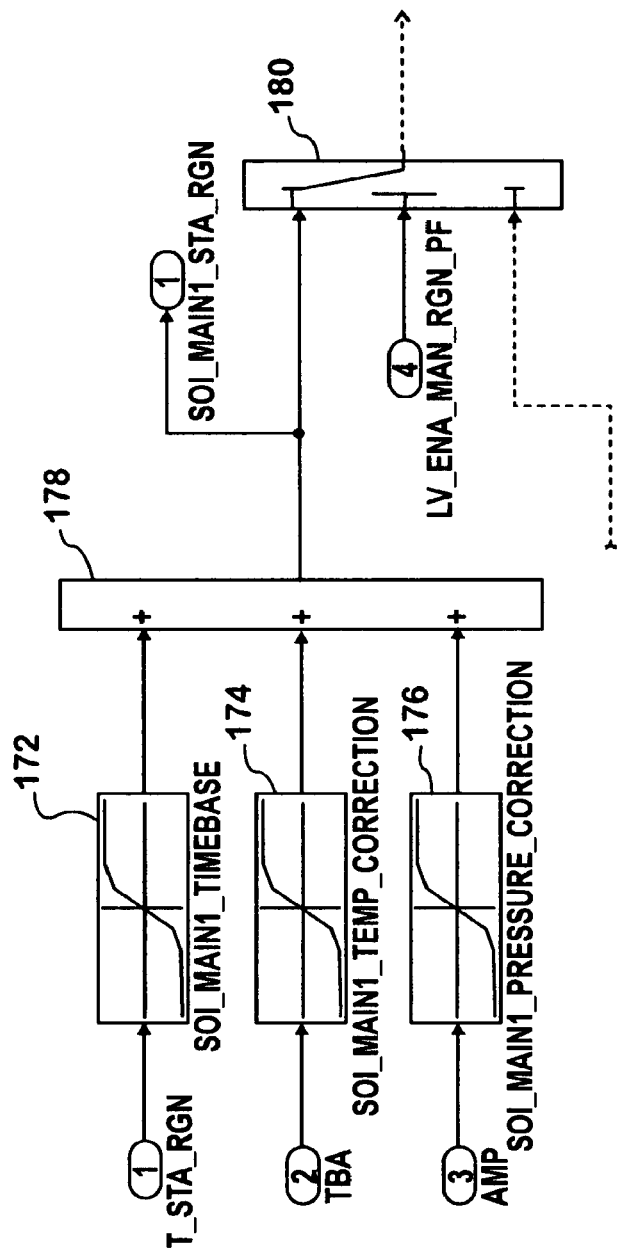
FIG. 12 shows an example of a strategy for controlling a representative parameter relevant to the regeneration process.

FIG. 12 shows one example of actuator set-point "ramping" for main fuel injection timing SOI (start of injection). Upon regeneration becoming active, LV_ENA_MAN_RGN_PF switches from logic "0" to logic "1". A time-based function 172 is used to control the set-point for SOI. The SOI_MAIN1_TIMEBASE table can be constructed in such a way that its output may be shaped to achieve the best performance possible. The other two time-based functions 174, 176 provide correction of the SOI value from function 170 to compensate for variations in ambient temperature and ambient atmospheric pressure (elevation above sea level), the correction being performed by a portion 178 of the engine control system. The substituted value for SOI set-point from portion 178 is switched into the fuel control portion of the engine control system via a switch function 180.

With appropriate adaptation, the example of FIG. 12 can be adopted for any or all of: engine idle speed, exhaust gas recirculation (EGR) valve position set-point, exhaust gas backpressure set-point, turbocharger vane position pre-control, fuel injection rail pressure set-point, intake throttle position set-point, and injection mass and injection timing for pilot injections and post-injections of fuel.

Each of the parameters/actuators mentioned can be activated at times and rates independent of the others. When stationary regeneration is complete, these parameters may be ramped back to their "normal" values using the respective "TIMEBASE" table before LV_ENA_MAN_RGN_PF transitions back to logic "0".

An example of an implementation is given for engine low idle speed set-point. At T_STA_RGN=0 seconds, low idle speed is ramped to a value of 1200 rpm or so depending on various conditions. The intake throttle is ramped to a nearly closed position at T_STA_RGN=0 seconds.

SOI_MAIN1 is held at a constant value for approximately 60 seconds after the throttle and idle speed have been ramped until conditions in the Diesel Oxidation Catalyst (DOC) are favorable for converting combustion by-products into exhaust gases suitable to passively burn soot out of the diesel particulate filter (DPF). When the DOC is ready, main fuel injection timing is retarded (by using SOI_MAIN1_TIMEBASE) to produce more of the combustion by-products that will create more heat and gases necessary for passive regeneration of the DPF.

While a presently preferred embodiment of the invention has been illustrated and described, it should be appreciated that principles of the invention apply to all embodiments falling within the scope of the invention that is defined as follows.

What is claimed is:

1. A diesel engine comprising:
an exhaust system through which exhaust gases created by combustion in combustion chambers pass to atmosphere and which comprises an after-treatment device that treats the gases before leaving the exhaust system but that at times requires regeneration by elevation of temperature of the gases to a regeneration temperature range;
an engine control system comprising a regeneration strategy for processing various data to control engine operation in a way that conditions the gases to cause regeneration of the after-treatment device; and
one or more personnel operated devices for enabling a person to selectively allow and disallow the regeneration strategy to be active wherein the various data include engine speed, and the regeneration strategy comprises distinct engine speed ranges one of which inhibits the regeneration strategy from being active, another of which automatically allows the regeneration strategy to be active, and still another of which allows the regeneration strategy to be made active in response to intentional activation by a person.

2. A diesel engine as set forth in claim 1 wherein the one or more personnel operated devices comprise at least one manually operated switch.

3. A diesel engine as set forth in claim 2 wherein the at least one manually operated switch comprises a switch that when manually actuated allows the regeneration strategy to be active and a switch that when manually actuated disallows the strategy to be active.

4. A diesel engine as set forth in claim 2 wherein the regeneration strategy comprises one that conditions the gases to cause nitrogen-dioxide-based regeneration, and at least one manually operated switch comprises a switch that when manually actuated allows the regeneration strategy to be active, provided that certain parameters are concurrently satisfied as conditions precedent to initiating nitrogen-dioxide-based regeneration, one of the conditions being that the engine is running at low idle speed in accordance with a low idle speed control strategy.

5. A diesel engine as set forth in claim 1 further including a wheeled motor vehicle that is propelled by the engine, and comprising inputs to the control system that are used by the control system to condition initiation of the after-treatment device by a regeneration-initiation input to the control system on satisfaction of certain conditions precedent to such initiation, including a condition of a regeneration-initiation device being operated, a condition of the vehicle being stationary, and a condition of engine temperature sufficiently high to initiate nitrogen dioxide-based regeneration.

6. A diesel engine as set forth in claim 5 further including a manual switch that when manually actuated is effective to disallow both initiation of nitrogen dioxide-based regeneration and continuation of an on-going nitrogen dioxide-based regeneration.

* * * * *